3,658,884
POLYMERISATION OF ACETYLENES
Keith George Allum, Bracknell, and Ronald David Hancock, Weybridge, England, assignors to The British Petroleum Company Limited, London, England
No Drawing. Filed May 6, 1970, Ser. No. 35,279
Claims priority, application Great Britain, May 12, 1969, 24,003/69
Int. Cl. C07c 69/52, 5/27
U.S. Cl. 260—486                9 Claims

ABSTRACT OF THE DISCLOSURE

Acetylenes are polymerized using, as a heterogeneous catalyst, the reaction product of a nickel compound and a polymer containing phosporus and a hydridic reducing agent. In an example nickel chloride was reacted with a phosporous-containing polystyrene and the product used as catalyst with sodium borohydride to polymerise phenyl acetylene. A yield of 70% 1,2,4 and 1,3,5 triphenyl benzenes was obtained.

---

This invention concerns a process for the polymerisation of acetylenes.

Many nickel (II) and nickel (O) complexes containing phosphines and phosphites as ligands are active catalysts for the cyclo-oligomerisation and polymerisation of acetylenes. Certain nickel complexes have also proved to be active for the co-oligomerisation of acetylene with substituted olefins. Some examples may be found in "Transition Metal Intermediates in Organic Synthesis" by C. W. Bird, published by Academic Press.

In the Journal of Organic Chemistry for March 1966 at pp. 985–7 there is disclosed a method for the cyclisation and polymerisation of acetylenes using as catalyst a mixture of hydridic reducing agent such as sodium borohydride and a nickel phosphine complex such as $$(Ph_3P)_2NiCl_2$$

These catalysts are homogeneous however and removing them from the reaction products may prove difficult.

One solution to the problem is to use a heterogeneous catalyst which can either be easily separated from the reaction products in the case of a slurry process or take the form of a fixed bed.

We have now devised a novel acetylene polymerisation process using a solid heterogeneous catalyst.

Thus according to the present invention there is provided a heterogeneous process for the polymerisation of acetylenes which comprises polymerising an acetylenically unsaturated monomer containing from 2 to 20 carbon atoms at a temperature in the range 0 to 300° C. in the presence of a solid catalyst comprising a polymer containing nickel or cobalt bonded to phosphorus atoms and, where the metal is divalent nickel, a hydridic reducing agent, under conditions such that polymerisation is effected.

The catalyst can be prepared by reaction of a nickel or cobalt compound with a polymer containing trivalent phosphorus in the molecule.

Suitable nickel and cobalt compounds are those capable of reaction with a phosphine or substituted phosphine and include halides, carbonyls, carbonyl halides, carboxylates, carbonyl carboxylates, acetonates, II-allyl and olefin complexes.

The preferred nickel compounds are nickel salts such as nickel chloride in which case a hydridic reducing agent will be necessary. Alternatively a zero valent complex of nickel such as Ni(CO)$_4$, nickel bis (II allyl), nickel cyclododecatriene, or Ni(CH=CHCN)$_2$ may be used, when no hydridic reducing agent is necessary.

The preferred polymeric supports are those prepared—

(a) by reacting a halogen-containing polymer with a metal phosphide as describel in our U. K. patent application No. 46,215/68.

Suitable halogen containing polymers include chloromethylated polystyrene, chloromethylated copolymers of styrene with halogen monomers, polyvinyl chloride, copolymers of vinyl chloride with other monomers, chlorinated polyethylene, chlorinated polypropylene, poly (para bromostyrene), polychloroprene, brominated polybutadiene and copolymers of 4-methylpentene and 5 bromopentene-1. The polymers should not contain groups, other than halogen, which react with the phosphorus compound. Preferred polymers are chloromethylated polystyrene, brominated polybutadiene, polyvinyl chloride and poly (para bromostyrene).

Alkali metal phosphides are particularly suitable for the reaction.

The preferred alkali metal phosphides are potassium diphenyl phosphide and dipotassium phenyl phosphide. Phosphides R$_2$ PM and RPM$_2$ where M is Li, Na or K and R is C$_2$H$_5$, n-C$_4$H$_9$ cyclo C$_6$H$_{11}$ or C$_6$H$_5$ are also suitable.

In a typical case it is thought that the reaction proceeds as follows:—

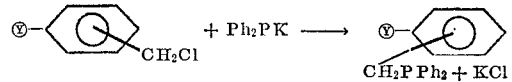

chloromethylated polystyrene.

(Y) represents the backbone (—CH—CH$_2$) of a polystyrene chain and Ph is a phenyl group, or (b) by polymerising an ethylenically unsaturated compound containing trivalent phosphorus or copolymerising such a compound with another ethlenically unsaturated monomer, for example as described in U.K. patent application No. 46,214/68, or (c) by reacting a compound containing halogen and phosphorus in the molecule e.g. diphenyl phosphine chloride or phenyl dichlorophosphine with a metallated polymer e.g. lithiated polystyrene in an inert solvent such as benzene at a temperature from —40 to 200° C. as described in United iKngdom patent application No. 46,217/68, or (d) by reacting a polymer containing one or more hydroxyl groups with a compound containing phosphorus and halogen or an —OR group where R is an aryl or alkyl in the molecule as described in our United Kingdom application No. 5,194/69.

Suitable trivalent phosphorus compounds for use in (d) above are phenyl phosphine dichloride, diphenyl phosphine chloride, phosphorus trichloride, phosphorus tribromide, trialkyl and triaryl phosphites of formula (RO)$_3$P where R contains up to 6 carbon atoms e.g. triethyl phosphite, trimethyl phosphite, triphenyl phosphite, and compounds of formula PhP(OR)$_2$, EtP(OR)$_2$, Ph$_2$POR where R is defined above and Ph is a phenyl group.

Suitable hydroxyl-containing polymers for use in (d) above are: polyvinyl alcohol, poly allyl alcohol, polystyrene substituted by —CH$_2$OH groups, polyethers containing —OH groups e.g. polyethylene glycol, poly-propylene glycol, polytetramethylene ether glycol and polyethers obtained by reacting an alkaylene oxide with a polymerisation initiator e.g. ethylene oxide with glycerol or sorbitol. Also suitable are polyesters obtained by reacting a polyfunctional acid with a stoichiometric excess of polyhydric alcohol e.g. the polyester derived from maleic acid and ethylene glycol or any of the phthalic acids with ethylene glycol. Also suitable are polyesteramides, phenol formaldehyde resins, cellulose or starch.

Polyvinyl alcohol is preferred.

The trivalent phosphorus compound preferably contains chlorine, a particularly preferred compound is phenyl phosphine dichloride.

The nickel and cobalt compounds can be put onto the polymeric supports containing trivalent phosphorus by the methods described in U.K. patent applications Nos. 46,216/68 and 5,193/69.

Preferably the percent by wt. of metal in the catalyst is from 0.1 to 20%, more preferably 1 to 10%. The lower molecular weight of the catalyst must be such that the material is solid. The upper limit of the molecular weight is not critical and in the case of a cross linked polystyrene can be well over a million. Preferably the molecular weight of the catalyst is in the range of 1000 to above 400,000 more preferably from 30,000 to 250,000.

Preferred supports are phosphorus-containing polystyrene and polyvinyl chloride.

The metal phosphorus containing polymers may themselves be supported or grafted onto conventional supports such as silica, alumina or sepiolite.

The polymerisation is suitably carried out at a pressure between 0 to 4000 p.s.i.g., although subatmospheric pressures can be used preferably the pressure is from 0 to 200 p.s.i.g. It has been found generally convenient to carry out the reaction at atmospheric pressure, although this is not critical.

Preferably the temperature is between 0° C. and 100° C., more preferably 80 to 100° C.

Preferred supports are phosphorus-containing polyvinyl chloride and polystyrene, especially the latter.

Preferably the acetylenically unsaturated compounds have from 2 to 10 carbon atoms per molecule e.g. acetylenic hydrocarbons such as acetylene, methyl acetylene or phenyl acetylene or isopropylacetylene. Substituted acetylenic compounds such as ethyl propiolate may also be used. The reaction may produce linear or substantially linear polymeric products but normally cyclic oligomers will be formed.

The nature of the product i.e. whether it is mainly cyclic or linear, depends on the particular acetylene being polymerised, e.g. cyclic products tend to be formed by monosubstituted acetylenes selected from the lower alkyl, aryl, vinyl, hydroxymethyl, alkoxycarbonyl, acyl and alkoxy acetylenes. Linear products tend to be formed by the less reactive monosubstituted acetylenes e.g. those substituted by higher alkyl, cyclohexyl and hydroxyl alkyl.

Normally an inert or reducing atmosphere should be present.

In those cases where a hydridic reducing agent is required as a co-catalyst, suitable reducing agents are sodium boronhydride and lithium aluminum hydride.

The reaction may take place in the presence of an inert solvent for the acetylene such as tetrahydrofuran, benzene or heptane. Anhydrous ethanol may in some cases, be used in conjunction with hydridic reducing agents such as sodium borohydride.

The reaction can be used for converting the acetylenes in steam cracked hydrocarbon streams into, for example, alkyl substituted benzenes. Thus the methyl acetylene in steam cracked $C_3$ streams may be converted into trimethyl benzenes.

The invention is illustrated but not limited by the following examples.

EXAMPLE 1

Preparation of phosphorus-containing polymer (a) 7.8 g. potassium metal (0.2 g. atom) were placed in 100 ml. of tetrahydrofuran under nitrogen in a flask equipped with stirrer, dropping funnel, reflux condenser and gas inlet tube. 22 g. of $Ph_2PCl$ (0.1 mole) in 50 ml. of tetrahydrofuran were added slowly to maintain reflux conditions. The reaction mixture was refluxed for a further hour after the addition was complete. To the refluxing solution 10 g. chloromethylated polystyrene (prepared by the method of Pepper et al., Journal of the Chemical Society, 1953, 4097) was added in 0.5 g. batches. The solution was refluxed for one hour. The recovered polymer was washed with methanol, aqueous methanol, and with methanol again before drying. The product was a white solid containing 5.6% wt. phosphorus.

(b) Into a flask flushed with $N_2$ and equipped with a mechanical stirrer, dropping funnel, reflux condenser and nitrogen line was placed dry THF (100 ml.) and potassium metal (7.8 g. 0.2 g. atoms). The flask contents were heated to reflux temperature, whereupon the potassium melted. $(C_6H_5)_2PCl$ (22 g. 0.1 mole) in THF (100 ml.) was cautiously added so as to maintain steady reflux. A red solution was produced. After the addition was complete the reactor contents were heated for a further 2 hours at reflux temperature. (10 g.) of polymer as used in (a) above was added in 0.5 batches at reflux temperatures. After the addition was complete the reaction mixture was poured into methanol and then filtered. After washing the solid product with aqueous methanol, methanol/acetic acid (10 percent v./v. acetic acid) and finally methanol the material was vacuum dried.

Phosphorus content of product: 3.6% weight.

Preparation of catalyst

A suspension in butanol of anhydrous nickel chloride (2.5 g.) (yellow) was heated for 1 hour under reflux with 5 g. of the cross linked phosphorus-containing polystyrene (phosphorus content=3.6 percent weight). The resulting purple polymer was washed with toluene and ether and then evacuated. Nickel content=4.9 percent weight.

Cyclization of phenyl acetylene

Into a flask flushed with nitrogen were placed portions of nickel-containing polymer (1.22 g.), $NaBH_4$ (1 g.) and 50 ml. of dry tetrahydrofuran. Phenyl acetylene (4.6 g.) dissolved in 50 ml. of tetrahydrofuran was then added and the reaction mixture refluxed for 2 hours. After working-up the solution to remove polymeric material, 1 gm. of a mixture of 1,2,4 and 1,3,5 triphenyl benzenes was obtained. (Yield=22 percent.)

(ii) Into a flask flushed with nitrogen were placed nickel-containing polymer (0.12 g.), tetrahydrofuran (5 ml.), $NaBH_4$ (0.1 g.) and phenyl acetylene (5 g.). The reaction mixture was stirred without heating for 4 hours. After working-up the solution, 3.5 g. of a mixture of 1,2,4 and 1,3,5 triphenyl benzenes was obtained. (Yield 70 percent.)

Polymerisation of ethyl propiolate

Reaction (b) above was repeated using ethyl propiolate in place of phenyl acetylene, 4 g. of a highly viscous polymeric liquid material resulted. (Yield 80 percent.)

We claim:
1. A process for the polymerisation of acetylenes into cyclic and linear polymers which comprises polymerising an acetylenically unsaturated monomer containing from 2 to 20 carbon atoms at a temperature in the range from 0 to 300° C. and a pressure of 0 to 200 p.s.i.g. in the presence of a solid heterogeneous catalyst comprising a polymer derived from a halogenated aromatic and/or olefinic polymer by reaction with a phosphorous-containing compound and containing nickel or cobalt bonded to said phosphorus atoms and, where the metal is divalent nickel, a hydridic reducing agent.

2. A process as claimed in claim 1 wherein the temperature is in the range 20 to 100° C.

3. A process as claimed in claim 1 wherein the reaction is effected in the presence of an inert solvent for the monomer.

4. A process as claimed in claim 1 wherein the acetylenically unsaturated monomer is a hydrocarbon.

5. A process as claimed in claim 1 wherein the acetylenically unsaturated monomer is ethyl propiolate.

6. A process as claimed in claim 4 wherein the hydrocarbon is selected from the group consisting of acetylene, methyl acetylene, phenyl acetylene and isopropenylacetylene.

7. A process for the preparation of cyclic and linear polymers which comprises polymerising an acetylenically unsaturated monomer containing from 2 to 20 carbon atoms at a temperature in the range of 0 to 300° C. and a pressure of 0 to 200 p.s.i.g. in the presence of a solid heterogeneous catalyst selected from the group consisting of (1) a polymer derived from a halogenated aromatic and/or olefinic polymer by reaction with a phosphorous-containing compound and containing a zero valent complex of nickel bonded to said phosphorous atoms, (2) a polymer derived from a halogenated aromatic and/or olefinic polymer by reaction with a phosphorous-containing compound and containing divalent nickel bonded to said phosphorous atoms in admixture with a hydridic reducing agent and (3) a polymer derived from a halogenated aromatic and/or olefinic polymer by reaction with a phosphorous-containing compound and containing cobalt bonded to said phosphorous atoms.

8. A process as claimed in claim 7 wherein the phosphorous-containing polymer has a molecular weight above 1000 and is selected from the group consisting of polyvinyl chloride and polystyrene.

9. A process for the polymerisation of acetylenes into cyclic and linear polymers which comprises polymerising an acetylenically unsaturated monomer containing from 2 to 20 carbon atoms at a temperature in the range from 0 to 300° C. and a pressure of 0 to 200 p.s.i.g. in the presence of a solid heterogeneous catalyst comprising a polymer with a molecular weight above 1000 selected from the group consisting of a phosphorous-containing polyvinyl chloride and a phospohorous-containing polystyrene.

References Cited
UNITED STATES PATENTS

| | | | |
|---|---|---|---|
| 3,117,952 | 1/1964 | Meriwether | 260—94.1 |
| 3,271,378 | 9/1966 | Daniels | 260—91.3 |
| 3,131,155 | 4/1964 | Luttinger | 252—428 |
| 2,980,741 | 4/1961 | Zeiss et al. | 260—668 |
| 3,277,198 | 9/1966 | Holm et al. | 260—673 |
| 3,187,013 | 6/1965 | Zeiss et al. | 260—346.1 |

OTHER REFERENCES

Journal of Organic Chemistry, March 1966, pp. 985–7, "Aromatization Reactions of Acetylenic Hydrocarbons in the Presence of the $(Ph_3P)_2NiCl_2$—$NaBH_4$ Catalyst."

DELBERT E. GANTZ, Primary Examiner

J. M. NELSON, Assistant Examiner

U.S. Cl. X.R.

260—668, 673